Patented Feb. 5, 1952

2,584,343

UNITED STATES PATENT OFFICE 2,584,343

REACTING POLYSILOXANE WITH GLYCERINE AND THEREAFTER WITH DICARBOXYLIC ACID AND PRODUCT

John T. Goodwin, Jr., and Melvin J. Hunter, Midland, Mich., assignors to Dow Corning Corporation, Midland, Mich., a corporation of Michigan No Drawing. Application January 7, 1950, Serial No. 137,474

3 Claims. (Cl. 260—45.4)

This invention relates to resinous thermosetting compositions of matter.

The copending application of Melvin J. Hunter et al., Serial No. 59,414, filed November 10, 1948, discloses and claims resin compositions prepared by reacting a silane of the type $R_nSiX_{4-n}$ with a polyhydric alcohol and thereafter reacting the product so obtained with a polybasic acid. Resins prepared in this manner are of great utility as coating compositions such as paint vehicles and wire enamels. However, only a limited range of compositions can be prepared by this method due to incompatibility.

The object of this invention is to prepare improved coating compositions which combine high heat stability and stress-strain properties in such a way as to render them eminently adaptable for use as high-temperature coatings.

In accordance with this invention a polysiloxane containing from 0.9 to 2.1 silicon bonded monovalent hydrocarbon radicals per silicon atom and from .05 to 2 silicon bonded alkoxy or acyloxy groups per silicon atom, the remainder of the valences of the silicon being satisfied by oxygen atoms of SiOSi linkages, is reacted with glycerine in amount such that the ratio of the siloxane functional groups to glycerine hydroxyls is from 0.1 to 1 and thereafter reacting the product thus formed with an acidic compound of the group dicarboxylic acids and anhydrides thereof in amount such that the ratio of acid groups to the sum of the siloxane functional groups plus OH groups is from .08 to .75.

In this application the term "siloxane functional groups" has reference to alkoxy and acyloxy radicals attached to the silicon of the partially hydrolyzed polysiloxanes. The term "acid groups" has reference to carboxyl and anhydride groups, it being understood that each anhydride group is equivalent to two carboxyl groups.

One method for preparing the partially hydrolyzed alkoxylated polysiloxanes employed in this invention is more fully described in the copending application of Lawrence A. Rauner, Serial No. 137,480, filed concurrently herewith. This method involves reacting a silane or a mixture of silanes responding to the general formula $R_nSiCl_{4-n}$ with an alcohol in amount such that the ratio of alkoxy groups to silicon in the reaction product is between 0.05 and 2. The resulting alkoxylated chlorosilane is then hydrolyzed by adding thereto water in amount sufficient to remove all of the chlorine atoms. Under such conditions only a very few of the alkoxy groups will be hydrolyzed, and the resulting siloxane will contain alkoxy groups in amount approximately equivalent to the alcohol added. During the alcoholysis and hydrolysis steps the temperature is maintained between 30° C. and 35° C. After addition of the water, any volatile materials which may be present are removed by distillation.

Any alkoxy radical, such as for example, methoxy, ethoxy, butoxy, and stearyloxy groups, may be employed in the process of this invention.

The resulting alkoxylated polysiloxanes are mobile liquids. For the purposes of this invention the R groups on the siloxane may be saturated aliphatic radicals containing less than seven carbon atoms, such as methyl, ethyl, propyl, butyl, cyclohexyl, and cyclopentyl radicals, or monocyclic aryl radicals such as phenyl, chlorophenyl, tolyl, and xylyl. Any combination of the above radicals produces resins which are satisfactory for coating materials.

It is at times desirable to employ acyloxy polysiloxanes having silicon bonded acyloxy radicals together with or in place of alkoxy groups. Such compounds may be prepared by several methods such as, for example, the chlorosilane may be reacted with a metallic salt of a carboxylic acid in amount to give a partially acyloxylated chlorosilane which may then be partially hydrolyzed as are the alkoxy silanes. Another method is that of reacting the above-defined alkoxy polysiloxanes with carboxylic acids. In such cases the acid will replace the alkoxy group on the silicon, with the elimination of the corresponding alcohol.

Resinous materials are obtained when any acyloxy group is employed in the method of this invention. However, particularly beneficial modifications, such as increased solubility in hydrocarbon solvents, have been obtained when the acyloxy group is one containing at least seven carbon atoms. Examples of such desirable groups are benzoyloxy, 2-ethyl hexoyloxy, stearyloxy, and linoleyloxy.

The siloxane is reacted with glycerine in amount such that the ratio of siloxane functional groups to glycerine hydroxyls is from 0.1 to 1. Upon mixing the glycerine and the siloxane, reaction begins at once between the glycerine and the silane functional groups to produce the siloxane-glycerine ester and an alcohol. Preferably, the reaction is carried out at a temperature between 100° C. and 210° C.

The glycerine-siloxane ester is then reacted with a dicarboxylic acid or anhydride thereof. Any acid having the formula HOOCRCOOH where R is a bivalent aryl or bivalent aliphatic radical is operative in the process of this invention. Examples of such acids are phthalic, malonic, maleic, and fumaric acids.

Reaction between the glycerine-silane ester and the acid proceeds by two mechanisms. One is that of a condensation between glycerine hydroxyls and the acid groups with the elimination of water. The other mechanism is that of splitting the SiOC linkages in the glycerine-siloxane ester, whereupon the acid becomes attached directly to the silicon. This reaction may be represented schematically as follows:

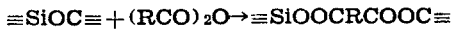

The latter phenomenon is readily apparent when an acid anhydride is reacted with a glycerine-siloxane ester in which the ratio of siloxane functional groups to glycerine hydroxyls is 1. In such cases there are essentially no unreacted hydroxyls in the ester. Yet the material reacts readily with the acid anhydride, as is shown by rapid fall in the acid number and resinification of the product.

Reaction between the acidic compound and the siloxane-glycerine ester is carried out preferably at a temperature between 170° C. and 210° C. and is continued until the reaction product shows signs of gellation. The material may then be dissolved in a solvent such as cyclohexanone, xylene, or ketones, and employed to coat base members.

If desired, the above reactions may be carried out in solvents such as cyclohexanone, aromatic hydrocarbons, and ketones.

The materials of this invention produce excellent coatings when baked upon metal surfaces. The coatings are normally cured at temperatures up to 250° C. The cured materials are exceedingly thermostable and possess excellent stress-strain properties. Accordingly, these materials are of great utility as paint vehicles for use at high temperatures. In this regard they are superior to both siloxane resins and to organic resins such as alkyds. Furthermore, it has been found that materials prepared by the particular method of this invention possess properties not obtainable by other methods for preparing siloxane-glycerine-dibasic acid resins.

The following examples are illustrative only.

*Example 1*

A mixture of chlorosilanes containing monoethyltrichlorosilane, ethylmethyldichlorosilane, monopropyltrichlorosilane, monoisopropyltrichlorosilane, propylmethyldichlorosilane, and ethylpropyldichlorosilane in such a ratio that the mixture contained an average of 1.25 alkyl radicals per silicon atom, was partially hydrolyzed as follows:

3,000 grams of the mixed chlorosilanes were mixed with 698 grams of ethyl alcohol and maintained at a temperature of between 2° C. and 10° C. for two hours. HCl evolved rapidly. At the end of this time 197.6 grams of water was added to the chloroethoxysilane, and the mixture was maintained at a temperature of between 30° C. and 35° C. for four hours. The mixture was then heated to reflux and the volatiles were removed by distillation. The partially hydrolyzed siloxane was neutralized with sodium bicarbonate, and the resulting mobile liquid was filtered. The resulting polysiloxane had an ethoxyl content of .6 ethoxyl radicals per silicon atom.

160 grams of the above siloxane was reacted with 46 grams of glycerine by heating a mixture of the two at a temperature between 100° and 200° C. until substantially the theoretical amount of ethyl alcohol had been removed. The resulting glycerine-siloxane ester was then heated with 37 grams of phthalic anhydride at a temperature of about 210° C. until the material began to gel. The resulting product was then dissolved in cyclohexanone, and the solution was applied to a tin surface and heated one hour at 200° C. A cured film was obtained.

*Example 2*

A siloxane was prepared in accordance with the procedure of Example 1 by reacting a mixture of 1038 grams of phenylmethyldichlorosilane and 128 grams of phenyltrichlorosilane with 229 grams of isopropanol and the resulting product was hydrolyzed by adding thereto 92 grams of water. The resulting hydrolyzate contained .40 isopropoxy radicals per silicon atom and had a degree of substitution of 1.9 hydrocarbon radicals per silicon atom.

196 grams of the above siloxane was reacted with 34.5 grams of glycerine by heating a mixture of the two at a temperature of about 170° C. until substantially the theoretical amount of isopropanol was obtained. The resulting product was then heated with 46 grams of phthalic anhydride until the product showed signs of gelling. The material was then dissolved in cyclohexanone, and it was found that when a can lid was coated with solution and cured two and a half hours at 200° C., a soft, tough coat was obtained.

*Example 3*

A siloxane was prepared in accordance with the method of Example 1, which siloxane contained .67 isopropoxy groups per silicon atom and had a degree of substitution of 1.7 methyl and phenyl radicals per silicon atom.

312 grams of the siloxane was reacted with 85 grams of stearic acid at a temperature of 160° C. Isopropyl alcohol was evolved. The resulting acyloxy siloxane was then reacted with 60 grams of glycerine, and the resulting product was reacted with 47 grams of phthalic anhydride. The product was then heated twelve and a half hours at 210° C. and thereafter dissolved in 100 grams of xylene.

A tin surface was coated with solution and then baked one and a half hours at 250° C. A hard, flexible, firmly adhering coat was obtained.

*Example 4*

236 grams of the siloxane of Example 3 was reacted with 46 grams of glycerine and 37 grams of phthalic anhydride in accordance with the method of Example 1. The resulting product was dissolved in cyclohexanone, and a tin surface was coated with the solution and then baked one hour at 250° C. A hard, tough, flexible, firmly adhering coat was obtained.

*Example 5*

A siloxane was prepared according to the method of Example 1 which contained .67 isopropoxy groups per silicon atom and contained 1.7 methyl and phenyl radicals per silicon. 236 grams of the siloxane was reacted with 122 grams of benzoic acid at 170° C. until substantially the theoretical amount of isopropanol was removed. The siloxane was a mobile liquid having .67 benzoyloxy groups per silicon atom and 1.7 methyl and phenyl radicals per silicon.

When this siloxane is reacted with 60 grams of U. S. P. glycerine and then with 47 grams of phthalic anhydride in accordance with the method of Example 1, a thermosetting, heat stable resin is obtained.

That which is claimed is:

1. A method of preparing resinous materials which comprises reacting a polysiloxane containing from 0.9 to 2.1 silicon-bonded monovalent hydrocarbon radicals per silicon atom, said radicals being selected from the group consisting of saturated aliphatic radicals of less than seven carbon atoms and monovalent aryl radicals, and from .05 to 2 silicon-bonded siloxane functional groups per silicon atom, said groups being selected from the group consisting of alkoxy and acyloxy radicals, said acyloxy radicals being of the formula RCOO— where R is a hydrocarbon radical, the remainder of the valences of the silicon atoms in said siloxane being satisfied by oxygen atoms, with glycerine in amount such that the ratio of silicon-bonded siloxane functional groups to glycerine OH is from 0.1 to 1 and thereafter reacting the siloxane-glycerine ester thus formed with an acidic compound selected from the group consisting of dicarboxylic acids and anyhdrides thereof in amount such that the ratio of dicarboxylic acid groups to the sum of the total introduced silicon-bonded siloxane functional groups plus hydroxyl groups is from .08 to .75.

2. The product prepared in accordance with claim 1.

3. The method in accordance with claim 1 wherein the monovalent hydrocarbon radicals are methyl and phenyl radicals.

JOHN T. GOODWIN, Jr.
MELVIN J. HUNTER.

REFERENCES CITED

The following references are of record in the file of this patent:

UNITED STATES PATENTS

| Number | Name | Date |
|---|---|---|
| 2,386,793 | Hanford | Oct. 16, 1945 |
| 2,395,550 | Iler et al. | Feb. 26, 1946 |
| 2,426,121 | Rust et al. | Aug. 19, 1948 |
| 2,529,956 | Myles et al. | Nov. 14, 1950 |

FOREIGN PATENTS

| Number | Country | Date |
|---|---|---|
| 583,754 | Great Britain | Dec. 30, 1946 |